United States Patent Office 2,735,748
Patented Feb. 21, 1956

2,735,748

PROCESS FOR RECOVERY OF TUNGSTEN VALUES

Eugene Wainer, Cleveland Heights, Ohio, assignor, by mesne assignments, to Sylvania Electric Products Inc., New York, N. Y., a corporation of Massachusetts No Drawing. Application July 12, 1951,
Serial No. 236,475

8 Claims. (Cl. 23—51)

Tungsten is an exceptionally important material commercially and strategically. It is used for imparting hardness, toughness, and refractoriness to a variety of alloy compositions for high temperature applications such as turbine buckets; it is a prime ingredient in high speed tool steels; in carbide form, it is used as a cutting medium; an important strategic use is its function as the armour piercing ingredient in shells.

A large variety of procedures have been developed for the decomposition of ores of tungsten in order to extract the tungsten values. In all cases without exception, a primary requirement of any one of these procedures is that the ore be finely divided before being subjected to breakdown attack. Standard methods of decomposing ores of tungsten are generally based on three main lines of approach. The first of these involves grinding or otherwise finely dividing the starting raw material and then digesting the ore with hydrochloric acid to which subsequently a small amount of nitric is added. The digestion is completed at the boiling temperature to completely insolubilize the tungstic acid which forms. A second standard procedure is the digestion of the ore with alkalies in which case water soluble sodium tungstate is formed. A third standard procedure is the fusion of the ore with alkalies or alkali salts and again in this last case, the desired reaction is the formation of water soluble sodium tungstate. In the acid digestion process, acids other than hydrochloric have not been regarded as feasible, as for example the ore is very slowly decomposed in sulfuric acid and before the reaction is completed, the residue containing a substantial quantity of the original tungsten value becomes insoluble in the sulfuric acid and the reaction ceases.

In accordance with the present invention, an accurate and economical process now becomes possible for recovering the tungsten value from scrap metals containing from 6 to 30 per cent tungsten content. Such scrap metals are obtained in limited quantities in the form of borings and the major portion of this scrap is available in the form of massive pieces weighing from one quarter of a pound up to as much as 10 pounds. Entirely outside of the means of decomposing the metal with any chemical solution attack, the primary difficulty presented is the need for a process which does not require that these massive pieces of scrap be broken down from the standpoint of size before being placed in solution. Hydrochloric methods of attack are only partially effective. And a major drawback to the use of hydrochloric acid is that such large quantities have to be used under boiling conditions that the economics become highly adverse in comparison with yields of tungsten obtainable from original ores.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

I have developed a simple and economical process which permits the scrap metal to be decomposed completely by treatment with inexpensive sulfuric acid, thus eliminating the need for hydrochloric acid in a first and expensive decomposition step. This unusual result has been developed as the rest of the finding that high tungsten content tool steels become readily soluble in boiling sulfuric acid if they are first subjected to a certain heat treatment under specified conditions. If this heat treatment is not used, when tool steel is placed in the acid bath, reaction proceeds for only a few minutes and then slows down very rapidly. Even though every effort is made to clean the surfaces of deposited tungstic oxide and to continue to replenish the acid bath with fresh quantities of acid, relatively little further reaction takes place. However, if the sample has been properly heat treated in accordance with the requirements of the present invention, a violent and rigorous reaction is intiated and continues at this rate until the sample is completely decomposed. Under these conditions, a solid sample of high speed tool steel weighing several pounds containing 10 to 20 per cent tungsten will be disintegrated completely in periods of 6 to 12 hours. The procedures are also quite effective for tool steel scrap in the form of turnings.

The types of tool steels referred to here will contain generally for instance from 6 to 30 per cent tungsten, from 0.50 to 1.5 carbon, 0 to 4 per cent chromium, and 0 to 2.25 per cent vanadium. Small amounts of other elements are sometimes present. Generally the balance consists chiefly of iron. In most of these steels, the tungsten is present in the form of the compounds $Fe_4W_2C$ or $Fe_3W_3C$.

The scrap metal is first subjected to a heating operation. There are reasons for believing that the tungsten content is converted to tungsten carbide, WC. This heat treating is at a temperature generally above ordinary heat treating of steel. It is such as to put the stock in a full hard condition. It involves heating the tungsten steel at temperatures in the range of 1100 to 1300° C. in a strongly reducing or carburizing atmosphere for times equivalent to 1 hour for each inch of thickness of the individual pieces. Thus, if the maximum thickness of an individual piece of the lot to be heat treated is 1 inch, the total time of treating in the temperature range given is about 1 hour. A slightly longer period is required at the lower limits of the temperature range given. At the upper temperatures, other effects are obtained which are useful for the present purpose. The reducing atmosphere may be carbon monoxide, or more simply the pieces may be heated buried in graphite or carbon or may be heated in a graphite or carbon crucible which is closed off from the atmosphere so that the proper heat treating gas is developed at the temperature of heating. Pack methods of heat treating may be used, but these provide difficulties in obtaining a proper soak. After the heating is completed, the metal is then abruptly cooled or quenched in either water of oil directly from the heat treating temperature. If the quenching takes place from the lower limits of the temperature range given and is carried out in oil, a fine grained brittle material is obtained. Quenching from the higher temperature gives a somewhat coarser grain, but this coarse grain manifestation does not interfere with the rate of subsequent solution in acid. If the material is quenched from the highest limit of temperature in water, the metal cracks rather readily and breaks up into smaller pieces, thus further facilitating the eventual solution in acid. The major feature of this heat treatment is that it must be carried out under conditions leaving the steel in full hard condition and in an atmosphere which cannot decarburize the surface.

After the heating operation, the metal is next decomposed completely with hot fairly concentrated sulfuric acid in amounts sufficient to combine with the iron and form ferrous sulfate, but insufficient to provide all the iron in the trivalent state. There may be for instance acid strength of 20 to 60 per cent by weight. These solutions are maintained close to the boiling point during the entire decomposition and as indicated, single pieces in chunks as large as 10 pounds will decompose completely under such conditions in periods of 6 to 12 hours. The tungsten carbide remains insoluble in the acid medium used. It is usually obtained as a sludge after the acid treatment in the form of an extremely finely divided black powder and it settles very rapidly from the hot concentrated ferrous sulfate solution.

After a first settling, the clear liquid is decanted from the black powder residue. An oxidation step is now applied, using some oxidizing agent that will oxidize ferrous ion to ferric ion and tungsten to full valence. This may be chlorine, potassium permanganate, sodium nitrate and acid, addition of sodium nitrate to the sulfuric acid, hydrogen peroxide, potassium dichromate, or electrolytic oxidation. However, from a practical point of view, nitric acid is preferred as most convenient, this being added to the clear liquid in an amount about 10 to 30 per cent by weight based on the anhydrous $HNO_3$ content. Solutions are then heated to boiling and maintained at boiling for 2 to 3 hours. Under these conditions, any tungsten remaining in solution is oxidized to the insoluble tungstic acid. After steeling and decantation, this tungstic oxide is removed by filtration. The filter cake thus obtained is combined with the crude tungsten carbide from the first decomposition.

Two lines of procedure are then available. In the first, the combined tungstic acid, crude complex tungstic carbide and some of the liquid containing iron sulfate, as determined by practical considerations (e. g. the amount in sludge from fairly complete decantation), are thoroughly mixed and then evaporated to dryness after which this material is heated to about 870° C. in an oxidizing atmosphere. Under these conditions, the tungsten content is transformed to a form in which it is soluble in sodium hydroxide. Digestion of the calcine with sodium hydroxide puts all the tungsten in solution in the form of sodium tungstate liquor and the iron and other agents remain behind as insoluble hydroxides, the amount of NaOH which is used thus being sufficient, or in some excess, to form $Na_2WO_4$.

An alternative procedure involves treating the concentrated slurry of complex tungsten carbide, tungstic oxide, and ferrous sulfate with small and successive amounts of concentrated nitric acid. A violent reaction takes place which oxidizes the carbide compounds and on heating, the decomposition is completed forming metatungstic acid. The nitric acid dispersion of the crude tungstic oxide is then added slowly and with stirring to hot concentrated hydrochloric acid maintained at near the boiling point to further purify the tungstic oxide or tungstic acid which is formed.

In the first procedure, crude sodium tungstate liquor is derived from treatment of the oxidized residues. In the second procedure, tungstic acid is obtained on treatment of the carbide residues with nitric acid which may be transformed to a purer form of tungstic acid by subsequent treatment in boiling hydrochloric acid. A modification which can also be used in this second case is to treat the oxidized slurry, that is after heating with nitric acid, with sufficient caustic to dissolve all of the tungstic acid which is formed, this treatment leaving the iron and other compounds in the form of insoluble hydrate, and again a crude tungstic liquor is obtained.

The commercial requirements for tungsten compounds and tungsten metals from the point of view of chemical specifications are extremely rigid and only exceptionally pure derivatives are suitable for the types of uses which have been developed for tungsten. For this reason, a series of purification steps are normally used. These purification steps are well known and need not be here described in detail.

Briefly, such purification steps involve the addition of a concentrated sodium tungstate liquor to boiling hydrochloric acid under specified conditions. The result of this reaction is the precipitation of fairly pure canary yellow hydrated tungstic acid. The hydrated tungstic acid is cleaned by decantation, filtration, and washing, and while still in the moist condition it is dissolved in ammonium hydroxide to form a water soluble ammonium derivative of tungsten. These ammonium tungsten solutions are carefully clarified and through the application of heat and evaporative techniques, large crystals of ammonium paratungstate are separated from the solution. Usually one and sometimes two crystallizations are required to produce a chemically pure ammonium paratungstate crystal.

These crystals may be transformed to chemically pure tungstic acid or tungsten oxide by heating carefully at elevated temperatures for required time. The tungstic oxide may then be changed to tungsten metal powder by reduction in hydrogen. The particle size of the tungsten metal powder is an important variable with respect to its subsequent usage. This particle size may be varied by variation in temperature at which the ammonium paratungstate is initially decomposed to oxide, variations in the temperature and speed at which the reduction in hydrogen takes place, or variations in the amount of water vapor which is present during the hydrogen reduction. All of these details of purification and formation of a suitable particle size tungsten powder are described in the literature. Thereafter, the pure tungsten powder may be transformed into filament type metal or wire through swaging procedures or if carbide is formed, the tungsten is heated under specified conditions with a proper amount of carbon or if it is desired to make a special alloy, the compressed tungsten powder is added to a molten bath of metal under well known conditions.

My process in its outstanding essentials is as follows: A tungsten alloy, e. g. high speed tool steel containing from 6 to 30 percent tungsten and having relatively high carbon contents is first heated, to fully hard condition in a reducing atmosphere in a temperature range of 1100° to 1300° C., followed by quenching. These massive blocks of tool steel are then decomposed in sulfuric acid and resulting in settling of finely divided insoluble carbide of tungsten which contains most of the original tungsten content of the tool steel. Tungsten which remains in the solution in the sulfuric acid is then precipitated by the addition of a small amount of nitric acid, after which tungsten residues are oxidized through the medium of heat or by the addition of nitric acid and are then transformed to sodium tungstate liquor by the addition of strong caustic alkali. Conversion of the sodium tungstate to tungsten oxide or tungsten metal of pure grade then follows standard procedures.

Important points of novelty in this process are:

1. The heat treatment of the tungsten alloys or tool steels under such conditions as to render the tool steel soluble in the inexpensive sulfuric acid.

2. The use of sulfuric acid as an attack agent on heat treated tool steel without the addition of any other expensive agents.

3. The oxidation of the tungsten residues obtained from the acid solution attack of the tool steel so as to put the tungsten content in a condition such that it is readily and quickly soluble in caustic alkali.

In the foregoing description, the use of solid billets of tool steel has been emphasized. Of course borings made from tool steels, and similar tungsten scrap, may be treated in the same way.

The following examples are illustrative of the method of practice.

*Example 1.*—100 pounds of high speed tungsten tool steel are selected so that each individual piece does not have a thickness exceeding one inch. The general analysis of this tool steel is roughly the following: 18% W, 4% Cr, 1% vanadium, and 0.9% carbon. The 100 pounds of scrap tool steel is heated in a muffle type furnace maintained at 1200° C. The furnace is gas fired using an excess of fuel so that a reducing atmosphere is maintained. In other words the point is that the atmosphere is carburizing. In order to make certain that a carburizing atmosphere is retained in the furnace during the heating, 10 pounds of petroleum coke in the form of 20 mesh particles are shoveled over the surface of the tool steel. When the cold metal is thrown into the furnace, the temperature drops and then slowly rises to the heat treating temperature. The time of treatment is taken from this point and the steel is maintained at this temperature and in the reducing atmosphere for about one hour. After the time cycle is completed, the tool steel is quickly quenched in a hydrocarbon oil and after cooling is removed from the quenching bath. The excess oil is shaken off in the centrifuge and the final traces of oil are removed by placing the tool steel in a water launder to which a small amount of detergent has been added.

An acid proof container is then provided and 300 pounds of water are placed therein. The washed tool steel is placed in an acid proof open network basket such that the charge is suspended several inches from the floor of the container and is still completely covered by the water. A stirrer is provided. To the agitated solution, 255 pounds of sulfuric acid of 1.82 specific gravity and 98% sulfuric acid content are added in a thin stream while the solution is being stirred. An exothermic reaction takes place as the result of the addition of the acid to water and the rate of the addition is maintained so that the temperature does not exceed roughly 100° C. A violent reaction ensues immediately. After all the sulfuric acid has been added, the solution is maintained at the boiling point through the medium of injection heaters. Under these conditions, the decomposition of the fully hardened tool steel is complete in periods of 6 to 12 hours. Over 90% of the tungsten value of the original steel is in the solution as a finely divided black slimy sludge in the form of an acid-insoluble complex tungsten carbide. The balance of the tungsten is either in solution or in colloidal dispersion in the iron sulfate liquor. On completion of the reaction, the carrying basket is removed from the solution and washed into the tank. The hot liquor is permitted to settle for about 30 minutes after which the clear supernatant liquor is decanted into another tank. The reaction tank is half filled with hot water and again decanted after settling into the first decantation tank. Fifty pounds of 48% nitric acid of specific gravity 1.42 are added to the clear sulfuric acid decant. The solution is heated to boiling through the medium of injection heaters and maintained at the boiling point for 2 to 3 hours. A brownish precipitate forms which settles rapidly. This precipitate is separated from the mother liquor by decantation and washing, and the precipitate is combined with the crude carbide obtained in the first operation. The sludge is evaporated to dryness and then placed in saggers to a depth of about ½ of an inch. It is then calcined in air at temperatures between 750° and 850° C. until the black color disappears completely, this operation requiring about one hour. Actually once the oxidation reaction has begun and a free flow of air passes over the trays, the oxidation reaction is self sustaining and is visibly exothermic. After removal from the calcining operation, the residue is ground to a fineness to pass through a 200 mesh screen. The batch is then digested with 10 pounds of sodium hydroxide dissolved in 30 pounds of water. This digestion is carried out at roughly 100° C. for about one hour. The solution is then diluted to three times its original volume with hot water after which the precipitate which forms is removed by decantation, washing, filtration, and washing on the filter press. All of the liquors obtained from this process are reserved. The tungsten is in the form of sodium tungstate liquor at this stage.

It is then precipitated as crude tungstic acid by the addition of the caustic liquor to boiling hot concentrated hydrochloric acid and finally recovered as ammonium paratungstate crystals through the processes afore-described and then transformed into either pure tungsten compounds or tungsten metal, in accordance with known procedures. A tungsten metal yield of 17.9 pounds is obtained indicating that the recovery is substantially complete. Normally yields of 97 to 98% can be expected.

*Example 2.*—High speed tungsten containing tool steel is heated under the conditions given in Example 1 except that the temperature of heat treatment is 1300° C. In this case, the tool steel is quenched in water which fractures the material considerably and makes the stock exceptionally brittle. The material is broken up in a jaw crusher after which it is treated in accordance with the procedures given in Example 1.

*Example 3.*—The material is heated in accordance with the procedure given in Example 1 and is put in solution in sulfuric acid as indicated. The combined wet sludges are placed in a glass lined steam jacketed evaporator and heated up to the boiling point. Fifteen pounds of concentrated nitric acid containing 48% $HNO_3$ and 1.42 specific gravity are added slowly and with stirring to the tungsten-containing sludge. A violent reaction takes place with the evolution of nitrogen oxide fumes and the sludge thickens and turns to a brownish yellow color. After all reaction has ceased, the evaporation is continued until most of the nitric acid has been removed. Water is then added until a readily stirrable slurry is available and this is usually accomplished through the addition of 15 to 20 pounds of water. A concentrated solution of sodium hydroxide is then added slowly with stirring to the tungsten slurry which is being maintained at a temperature roughly 100° C. The solution of caustic consists roughly 25 pounds of sodium hydroxide dissolved in 50 pounds of water. After all the sodium hydroxide has been added, the solution is digested for an hour, after which the slurry obtained is transferred to a tank and diluted with 3 volumes of hot water. The liquor is clarified by setting, decantation, filtration, and washing, and all the liquors are reserved, these containing chiefly sodium tungstate.

*Example 4.* High speed tungsten tool steel is treated as in Example 1 and the crude concentrates of tungsten oxide, complex tungsten carbide and the like are collected as before. The combined slurry is oxidized with nitric acid as given in Example 3. A solution consisting of 25 pounds of hydrochloric acid of 36% concentration, 1.18 specific gravity is heated to about 80° C. The nitric oxide oxidized slurry is then added slowly with stirring to this hydrochloric acid solution. Under these conditions, tungstic acid in canary yellow form precipitates out. After the addition of the tungsten slurry is compete, the solution is then maintained at the boiling point for about one hour. The tungstic acid may be separated from the mother liquor by settling, decantation, washing, filtering and washing, after which the tungstic acid may be put in solution by digesting with sodium hydroxide to form the sodium tungstate liquor. In this case, 10 pounds of sodium hydroxide dissolved in a suitable quantity of water will completely solubilize the metatungstic acid.

The amounts of reagents, various times and temperatures of treatments described in the foregoing description and in the examples represent values slightly above the minimum requirements. These amounts may be increased if desired, in some cases to facilitate the operation, but no real benefit would be derived from such further increase since this simply increases the reagent cost and the cost of the process.

Other modes of applying the principle of the invention may be employed, change being made as regards the details described, provided the features stated in any of the following claims or the equivalent of such be employed.

I therefore particularly point out and distinctly claim as my invention:

1. In a process of recovering tungsten from tungsten tool steels the steps comprising, heating the alloy at 1100–1300° C. under carburizing conditions to complete hardness, quench-cooling the carburized material, digesting the material in a sulphuric acid solution with adding of increments of the acid at a rate controlling the temperature to around 100° C., continuing the digestion until a carbide sludge forms, separating the liquid from the carbide sludge, adding to the liquid nitric acid in amount about ten to thirty per cent of the weight based on the anhydrous $HNO_3$ content, boiling to formation of a precipitate, separating the precipitate and combining it with the carbide sludge, drying such mass and calcining in oxidized conditions at 750–850° C., then digesting in caustic soda solution at around 100° C., diluting, washing the precipitate formed, and collecting the tungsten liquor for further processing.

2. In a process of recovering tungsten from tungsten tool steels the steps comprising, heating the tungsten tool steel at 1100–1300° C. under carburizing conditions to complete hardness, quench-cooling the carburized material, digesting the material in sulphuric acid solution with adding of increments of the acid at a rate controlling the temperature to around 100° C., continuing the digestion until a carbide sludge forms, separating the liquid from the carbide sludge, adding to the liquid nitric acid in amount about ten to thirty per cent of the weight based on the anhydrous $HNO_3$ content, boiling to formation of a precipitate, separating the precipitate and combining it with the carbide sludge, treating such mass with nitric acid added in increments, and treating this slurry with caustic soda to form a tungstate liquor from which a paratungstate can be recovered.

3. In a process of recovering tungsten from tungsten tool steels the steps comprising, heating the tungsten tool steel at 1100–1300° C. under carburizing conditions to complete hardness, quench cooling the carburized material, digesting the material in sulphuric acid at a temperature of about 100° C. until a carbide sludge forms, separating liquid from sludge, adding nitric acid to the liquid in amount about ten to thirty per cent of the weight based on the anhydrous $HNO_3$ content, boiling to formation of a precipitate, separating the precipitate and combining it with the carbide sludge, drying such mass and calcining in oxidizing conditions at 750–850° C., digesting in caustic soda solution at around 100° C., diluting and collecting and washing the precipitate, and purifying the tungstate liquor so obtained.

4. A method for recovering tungsten values from a ferro-tungsten alloy which comprises the steps of reacting said alloy with carbon in a reducing atmosphere and at a temperature falling within the range 1100–1300° C., until a major portion of the tungsten values are combined with carbon to produce tungsten carbide; quench cooling the alloy so treated; digesting the quenched alloy in a sulphuric acid solution containing between 20%–60% by weight of acid until the ferro values and the unreacted portion of the tungsten values go into solution as low valence ions, the tungsten carbide being insoluble in said solution; separating the tungsten carbide from said solution; and treating the carbide free solution with an oxidizing agent capable of oxidizing said low valence ions to full valence until the tungsten ions therein are oxidized to form tungstic acid as a precipitate.

5. A method as set forth in claim 4 wherein said oxidizing agent is nitric acid.

6. A method for recovering tungsten values from a ferro-tungsten alloy which comprises the steps of reacting said alloy with carbon in a reducing atmosphere and at a temperature falling within the range 1100°–1300° C. until a major portion of the tungsten values are combined with carbon to produce tungsten carbide; quench cooling the alloy so treated; digesting the quenched alloy in a sulphuric acid solution containing between 20%–60% by weight of acid until the iron values and the unreacted portion of the tungsten values go into solution, the tungsten carbide being insoluble therein and remaining as sludge; removing said carbide sludge; and heat treating the sludge free solution with nitric acid at a temperature sufficient to cause said solution to boil until the tungsten ions in solution are precipitated as tungstic acid sludge.

7. A method as set forth in claim 6 further including the steps of separating the tungstic acid sludge from its solution; mixing the acid sludge with the tungsten carbide sludge; evaporating the sludge mixture to dryness; calcining said dry sludge mixture in air; and digesting said calcined mixture with sodium hydroxide to form sodium tungstate liquor.

8. A method as set forth in claim 7 further including the steps of separating the tungstic acid sludge from its solution; mixing the acid sludge with the tungsten carbide sludge; heat treating said sludge mixture with small and successive amounts of nitric acid to convert the tungsten values in said sludge mixture to metatungstic acid.

References Cited in the file of this patent

UNITED STATES PATENTS

| 583,993 | Gutensohn | June 8, 1897 |
| 1,081,566 | Becket | Dec. 16, 1913 |
| 1,119,929 | Davis | Dec. 8, 1914 |
| 1,277,475 | Pfanstiehl | Sept. 3, 1918 |
| 1,399,245 | Bleecker | Dec. 6, 1921 |
| 1,652,646 | Stoddard | Dec. 13, 1927 |
| 1,848,266 | Patrick et al. | Mar. 8, 1932 |
| 1,972,136 | Driggs | Sept. 4, 1934 |
| 2,366,250 | Foulke et al. | Jan. 2, 1945 |
| 2,386,081 | Archibald et al. | Oct. 2, 1945 |
| 2,485,175 | Trapp | Oct. 18, 1949 |
| 2,529,778 | McKenna | Nov. 14, 1950 |

FOREIGN PATENTS

| 593,906 | Great Britain | Oct. 29, 1947 |
| 623,577 | Great Britain | May 19, 1949 |